United States Patent
Lee et al.

(10) Patent No.: US 10,245,962 B2
(45) Date of Patent: Apr. 2, 2019

(54) ACTIVE RECTIFIER FOR WIRELESS POWER TRANSFER SYSTEM, VEHICLE ASSEMBLY USING SAME AND OPERATION METHOD THEREOF

(71) Applicant: Hyundai Motor Company, Seoul (KR)

(72) Inventors: Woo Young Lee, Gyeonggi-do (KR); Hyun Wook Seong, Gyeonggi-do (KR); Gyu Yeong Choe, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 178 days.

(21) Appl. No.: 15/297,808

(22) Filed: Oct. 19, 2016

(65) Prior Publication Data

US 2017/0120759 A1 May 4, 2017
US 2019/0047422 A9 Feb. 14, 2019

(30) Foreign Application Priority Data

Nov. 2, 2015 (KR) .......................... 10-2015-0153183

(51) Int. Cl.
*H02J 7/00* (2006.01)
*B60L 11/18* (2006.01)
(Continued)

(52) U.S. Cl.
CPC ......... *B60L 11/182* (2013.01); *B60L 11/1812* (2013.01); *B60L 11/1861* (2013.01); *H02J 7/025* (2013.01); *H02J 50/10* (2016.02); *H02J 50/90* (2016.02); *H02M 7/217* (2013.01); *H02M 7/219* (2013.01); *B60L 2210/30* (2013.01); *Y02T 10/7005* (2013.01); *Y02T 10/705* (2013.01);
(Continued)

(58) Field of Classification Search
CPC . Y02E 60/12; H02J 7/025; H02J 50/90; H02J 50/10; Y02T 90/122; B60L 11/182; B60L 11/1811; B60L 11/1827; H02M 7/217; H02M 7/219; H01F 38/14
USPC ........................................................ 320/108
See application file for complete search history.

(56) References Cited

U.S. PATENT DOCUMENTS

2008/0007225 A1\* 1/2008 Alvarez-Troncoso ....................... H01M 10/06 320/132
2011/0149606 A1\* 6/2011 Ho ...................... B60L 11/1811 363/17

(Continued)

FOREIGN PATENT DOCUMENTS

| JP | 5700133 B2 | 4/2015 | |
|---|---|---|---|
| WO | WO 2014205452 A1 \* | 12/2014 | ............... H02J 7/02 |
| WO | 2015/032524 A1 | 3/2015 | |

*Primary Examiner* — Richard Isla
*Assistant Examiner* — Mohammed J Sharief
(74) *Attorney, Agent, or Firm* — Mintz Levin Cohn Ferris Glovsky and Popeo, P.C.; Peter F. Corless

(57) ABSTRACT

An active rectifier for a wireless power transfer system includes: a first rectifying circuit; a second rectifying circuit; a first switching circuit and a second switching circuit. The first rectifying circuit, the second rectifying circuit, the first switching circuit, and the second switching circuit are arranged in a form of a bridge circuit between a secondary coil of a vehicle and a battery of the vehicle, and the active rectifier controls the first and second switching circuits according to a charging status of the battery or an output status of the wireless power transfer system in order to change or maintain a charging power to the battery.

12 Claims, 9 Drawing Sheets

(51) Int. Cl.
  *H02M 7/219* (2006.01)
  *H02J 7/02* (2016.01)
  *H02J 50/10* (2016.01)
  *H02J 50/90* (2016.01)
  *H02M 7/217* (2006.01)

(52) U.S. Cl.
  CPC ........ *Y02T 10/7044* (2013.01); *Y02T 10/7072* (2013.01); *Y02T 10/7241* (2013.01); *Y02T 10/92* (2013.01); *Y02T 90/122* (2013.01); *Y02T 90/127* (2013.01); *Y02T 90/14* (2013.01); *Y02T 90/16* (2013.01)

(56) References Cited

U.S. PATENT DOCUMENTS

| | | | |
|---|---|---|---|
| 2013/0113283 A1* | 5/2013 | Shiek | H02J 7/00 307/31 |
| 2013/0293192 A1* | 11/2013 | Abe | B60L 11/123 320/108 |
| 2014/0285030 A1 | 9/2014 | Nakamura et al. | |
| 2016/0065079 A1* | 3/2016 | Bai | B60L 11/182 363/21.01 |
| 2016/0156272 A1* | 6/2016 | Miura | H02M 3/33561 363/17 |
| 2016/0221451 A1 | 8/2016 | Plum et al. | |
| 2016/0355097 A1* | 12/2016 | Konet | B60L 11/182 |

\* cited by examiner (a)

(b)

ACTIVE RECTIFIER FOR WIRELESS POWER TRANSFER SYSTEM, VEHICLE ASSEMBLY USING SAME AND OPERATION METHOD THEREOF

CROSS-REFERENCE TO RELATED APPLICATION

This application claims priority to and the benefit of Korean Patent Application No. 2015-0153183 filed on Nov. 2, 2015 in the Korean Intellectual Property Office (KIPO), the entire contents of which are hereby incorporated by reference as if fully set forth herein.

BACKGROUND

1. Technical Field

The present disclosure relates generally to a vehicle assembly for a wireless power transfer system, and more particularly, to an active rectifier for the wireless power transfer system, which can control the amount of power received through wireless power transfer without additional wireless communications with a ground assembly, a vehicle assembly using the same, and an operation method thereof.

2. Related Art

As on the development of electric vehicles (EV) and plug-in hybrid vehicles (PHEV) have increased, an on-board charger (OBC) for high-voltage battery charging has become an essential component in the automotive industry. Meanwhile, wireless power transfer (WPT) technologies used for charging high-voltage batteries without connectors have been introduced as an alternative to conductive charging for which connectors have been typically used.

In order to charge the high-voltage batteries of such vehicles using a WPT system, a charging voltage and/or current should be changed according to a charging status of the batteries. Conventional techniques typically use wireless communications to transfer information regarding output of the WPT system from the vehicle to a ground assembly in a primary side, while the ground assembly controls switching frequency or voltage for the primary side. Conventional techniques also include a method for coping with changes of voltage/current according to a status of the battery, in which an additional converter is inserted between the WPT system and the high-voltage battery in order to change a voltage or current according to charging status of the high-voltage battery of the vehicle.

However, when the conventional method of using wireless communications is used, operations of the WPT system can be stopped or a part of the system or the battery may be damaged due to time delay or communication failures of the wireless communications. Also, in the case that the additional converter is inserted between the WPT system and the high-voltage battery, the additional converter may increase the size of the system making it difficult to install the system in the vehicle, and increasing a manufacturing cost of the vehicle.

SUMMARY

Accordingly, example embodiments of the present disclosure are provided to substantially obviate one or more problems due to limitations and disadvantages of the related art.

Example embodiments of the present disclosure provide an active rectifier which can directly control output of a wireless power transfer system in a vehicle, without using a communication means for wireless communications between a primary side (e.g., a ground assembly) and a secondary side (e.g., a vehicle assembly), nor without using an additional converter between a secondary coil of the vehicle and a high-voltage battery.

Example embodiments of the present disclosure also provide a vehicle assembly using the above-described active rectifier, and an operation method of the vehicle assembly.

Example embodiments of the present disclosure also provide a vehicle assembly for a wireless power transfer system and an operation method of the vehicle assembly, which can control the desired output of the wireless power system through an intentional misalignment between primary and secondary coils.

In accordance with embodiments of the present disclosure, an active rectifier for a wireless power transfer system includes: a first rectifying circuit; a second rectifying circuit; a first switching circuit and a second switching circuit. The first rectifying circuit, the second rectifying circuit, the first switching circuit, and the second switching circuit are arranged in a form of a bridge circuit between a secondary coil of a vehicle and a battery of the vehicle, and the active rectifier controls the first and second switching circuits according to a charging status of the battery or an output status of the wireless power transfer system in order to change or maintain a charging power to the battery.

A first connection node between a first terminal of the first rectifying circuit and a first terminal of the first switching circuit, and a second connection node between a first terminal of the second rectifying circuit and a first terminal of the second switching circuit may be connected to both ends of the secondary coil, and a first common terminal between a second terminal of the first rectifying circuit and a second terminal of the second rectifying circuit, and a second common terminal between a second terminal of the first switching circuit and a second terminal of the second switching circuit may be connected to both ends of the battery.

The active rectifier may further comprise a controller controlling the first and second switching circuits and outputting control signals for one or more of the first switching circuit and the second switching circuit based on battery charging status information received from the battery.

The controller may control on-off operations of one or more of the first switching circuit and the second switching circuit according to a phase of a voltage or current induced in the secondary coil.

When the battery is charged, the controller may selectively turn on or off one of the first and second switching circuits while the other of the first and second switching circuits is turned off, according to a phase of the voltage or current induced in the secondary coil.

When the battery is not charged, the controller may selectively turn on or off one of the first and second switching circuits while the other of the first and second switching circuits is turned on, according to a phase of the voltage or current induced in the secondary coil.

The first switching circuit or the second switching circuit may include a semiconductor switching element including a switch channel through which a current flows when turned on, and a current flows through a body diode when turned off.

Furthermore, in accordance with embodiments of the present disclosure, a vehicle assembly used for a wireless power transfer system includes: a secondary coil which is equipped in a vehicle, and couples inductively with an external primary coil; a battery equipped in the vehicle for driving the vehicle; and a rectifier including a first rectifying circuit, a second rectifying circuit, a first switching circuit, and a second switching circuit which are arranged in a form of a bridge circuit between the secondary coil and the battery.

In the rectifier, a first connection node between a first terminal of the first rectifying circuit and a first terminal of the first switching circuit, and a second connection node between a first terminal of the second rectifying circuit and a first terminal of the second switching circuit may be connected to both ends of the secondary coil, and a first common terminal between a second terminal of the first rectifying circuit and a second terminal of the second rectifying circuit, and a second common terminal between a second terminal of the first switching circuit and a second terminal of the second switching circuit may be connected to both ends of the battery.

The vehicle assembly may further comprise a vehicle assembly controller receiving battery charging status information and controlling the rectifier based on the battery charging status information.

The vehicle assembly controller may control on-off operations of one or more of the first switching circuit and the second switching circuit according to a phase of a voltage or current induced in the secondary coil.

When the battery is charged, the vehicle assembly controller may selectively turn on or off one of the first and second switching circuits while the other of the first and second switching circuits is turned off, according to a phase of the voltage or current induced in the secondary coil.

When the battery is not charged, the vehicle assembly controller may selectively turn on or off one of the first and second switching circuits while the other of the first and second switching circuits is turned on, according to a phase of the voltage or current induced in the secondary coil.

The first switching circuit or the second switching circuit may include a semiconductor switching element including a switch channel through which a current flows when turned on, and a current flows through a body diode when turned off.

The vehicle assembly may further comprise at least one of a resonance circuit located between the secondary coil and the rectifier, an impedance matching circuit between the secondary coil and the rectifier, a filter located between the secondary coil and the rectifier, and an impedance converter located between the rectifier and the battery.

Furthermore, in accordance with embodiments of the present disclosure, an operation method of a vehicle assembly including a secondary coil and a rectifier which controls output of the rectifier to manage charging of a battery equipped in a vehicle includes: receiving battery charging status information from the battery; determining whether a battery charging level according to the battery charging status information is greater than a reference level; and when the battery charging level is greater than the reference level, controlling a first switching circuit and a second switching circuit of the rectifier according to a charging status of the battery. A first rectifying circuit, a second rectifying circuit, the first switching circuit, and the second switching circuit are arranged in a form of a bridge circuit in the rectifier.

The controlling may include, when the battery is charged, selectively turning on or off one of the first and second switching circuits while turning off the other of the first and second switching circuits according to a phase of a voltage or current induced in the secondary coil; and when the battery is not charged, selectively turning on or off one of the first and second switching circuits while turning off the other of the first and second switching circuits according to the phase of the voltage or current induced in the secondary coil.

Furthermore, in accordance with embodiments of the present disclosure, an operation method of a vehicle assembly including a secondary coil and a rectifier which controls output of the rectifier to manage charging of a battery equipped in a vehicle includes: receiving battery charging status information from the battery; determining whether a battery charging level according to the battery charging status information is greater than a reference level; and when the battery charging level is greater than the reference level, moving the secondary coil to misalign the secondary coil with a primary coil which inductively couples with the secondary coil within a predetermined range.

The method may further comprise, after the moving of the secondary coil, detecting a current flowing through the secondary coil; comparing the current with a reference current; and adjusting the misalignment between the primary and secondary coils by further moving the secondary coil so that the current falls within an error range of the reference current.

The method may further comprise, after the moving of the secondary coil, controlling a first switching circuit and a second switching circuit of the rectifier according to a charging status of the battery or an output status of a wireless power transfer system, in order to increase or decrease charging power to the battery. A first rectifying circuit, a second rectifying circuit, the first switching circuit, and the second switching circuit are arranged in a form of a bridge circuit in the rectifier.

Using the above-described active rectifier for a wireless power transfer system, a vehicle assembly using the active rectifier, and an operation method of the vehicle assembly according to embodiments of the present disclosure, the output of the wireless power transfer system can be controlled so that the charging of a high-voltage battery can be simply and efficiently managed, without using a communication means for wireless communications between a primary side (e.g., a ground assembly) and a secondary side (e.g., a vehicle assembly), nor without using an additional converter between a secondary coil of the vehicle and a high-voltage battery.

As compared to the conventional technique using wireless communications, operation stops of the wireless power transfer or damage in a part of the system or the battery, due to time delay or occasional communication failures of the wireless communications can be prevented.

Since addition of a converter between the wireless power transfer system and the high-voltage battery becomes unnecessary, increase of the size or material cost of the system due to the addition of the converter can be prevented.

The output of the rectifier in the VA can be more effectively controlled and the charging of the high-voltage battery can be managed, by intentionally misalign the primary and secondary coils, or adjusting a magnetic induction gap between the primary and secondary coils through movement of the secondary (or, primary) coil.

BRIEF DESCRIPTION OF DRAWINGS

Example embodiments of the present disclosure will become more apparent by describing in detail example embodiments of the present disclosure with reference to the accompanying drawings, in which.

DETAILED DESCRIPTION OF EMBODIMENTS

Figure 1:
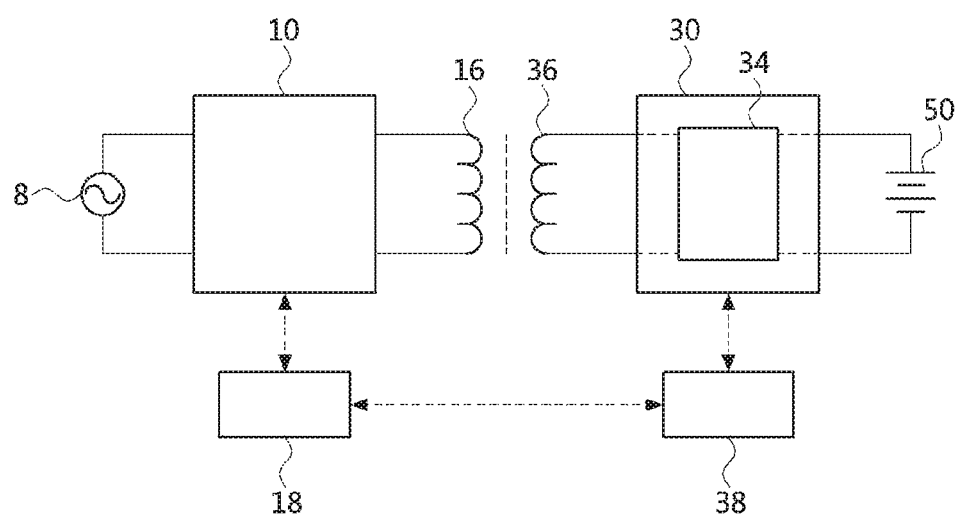
FIG. 1 is a conceptual view of a wireless power transfer system including an active rectifier according to embodiments of the present disclosure.

Example embodiments of the present disclosure are disclosed herein. However, specific structural and functional details disclosed herein are merely representative for purposes of describing example embodiments of the present disclosure, however, example embodiments of the present disclosure may be embodied in many alternate forms and should not be construed as limited to example embodiments of the present disclosure set forth herein. While describing the respective drawings, like reference numerals designate like elements.

It will be understood that although the terms "first", "second", etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

'Electric Vehicle, EV': An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

'Plug-in Electric Vehicle, PEV': An Electric Vehicle that recharges the on-vehicle primary battery by connecting to the power grid.

'Plug-in vehicle, PV': An electric vehicle rechargeable through wireless charging from an electric vehicle supply equipment (EVSE) without using a physical plug or a physical socket 'Heavy duty vehicle; H.D. Vehicle': Any four-or more wheeled vehicle as defined in 49 CFR 523.6 or 49 CFR 37.3 (bus).

'Light duty plug-in electric vehicle': A three or four-wheeled vehicle propelled by an electric motor drawing current from a rechargeable storage battery or other energy devices for use primarily on public streets, roads and highways and rated at less than 4,545 kg gross vehicle weight.

'Wireless power charging system, WCS': The system for wireless power transfer and control between the GA and VA including alignment and communications. This system transfers energy from the electric supply network to the electric vehicle electromagnetically through a two-part loosely coupled transformer.

'Wireless power transfer, WPT': The transfer of electrical power from the AC supply network to the electric vehicle by contactless means.

'Utility': A set of systems which supply electrical energy and include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

'Smart charging': A system in which EVSE and/or PEV communicate with power grid in order to optimize charging ratio or discharging ratio of EV by reflecting capacity of the power grid or expense of use.

'Automatic charging': A procedure in which inductive charging is automatically performed after a vehicle is located in a proper position corresponding to a primary charger assembly that can transfer power. The automatic charging may be performed after obtaining necessary authentication and right.

'Interoperability': A state in which component of a system interwork with corresponding components of the system in order to perform operations aimed by the system. Also, information interoperability may mean capability that two or more networks, systems, devices, applications, or components can efficiently share and easily use information without giving inconvenience to users.

'Inductive charging system': A system transferring energy from a power source to an EV through a two-part gapped core transformer in which the two halves of the transformer, primary and secondary coils are physically separated from one another. In the present disclosure, the inductive charging system may correspond to an EV power transfer system.

'Inductive coupler': The transformer formed by the coil in the GA Coil and the coil in the VA Coil that allows power to be transferred with galvanic isolation.

'Inductive coupling': Magnetic coupling between two coils. In the present disclosure, coupling between the GA Coil and the VA Coil.

'Ground assembly, GA': An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

'Vehicle assembly, VA': An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

'Primary device': An apparatus which provides the contactless coupling to the secondary device. That is, the primary device may be an apparatus external to an EV. When the EV is receiving power, the primary device may act as the source of the power to be transferred. The primary device may include the housing and all covers.

'Secondary device': An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

'GA controller': The portion of the GA which regulates the output power level to the GA Coil based on information from the vehicle.

'VA controller': The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

'Magnetic gap': The vertical distance between the plane of the higher of the top of the litz wire or the top of the magnetic material in the GA Coil to the plane of the lower of the bottom of the litz wire or the magnetic material in the VA Coil when aligned.

'Ambient temperature': The ground-level temperature of the air measured at the subsystem under consideration and not in direct sun light.

'Vehicle ground clearance': The vertical distance between the ground surface and the lowest part of the vehicle floor pan.

'Vehicle magnetic ground clearance': The vertical distance between the plane of the lower of the bottom of the litz wire or the magnetic material in the VA Coil mounted on a vehicle to the ground surface.

'VA Coil magnetic surface distance': the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

'Exposed conductive component': A conductive component of electrical equipment (e.g., an electric vehicle) that may be touched and which is not normally energized but which may become energized in case of a fault.

'Hazardous live component': A live component, which under certain conditions can give a harmful electric shock.

'Live component': Any conductor or conductive component intended to be electrically energized in normal use.

'Direct contact': Contact of persons with live components. (See IEC 61440)

'Indirect contact': Contact of persons with exposed, conductive, and energized components made live by an insulation failure. (See IEC 61140)

'Alignment': A process of finding the relative position of primary device to secondary device and/or finding the relative position of secondary device to primary device for the efficient power transfer that is specified. In the present disclosure, the alignment may direct to a fine positioning of the wireless power transfer system.

'Pairing': A process by which a vehicle is correlated with the unique dedicated primary device, at which it is located and from which the power will be transferred. The pairing may include the process by which an VA controller and GA controller of a charging spot are correlated. The correlation/association process may include the process of the establishment of a relationship between two peer communication entities.

'Command and control communication': The communication between the EV supply equipment and the EV exchanges information necessary to start, control and terminate the process of WPT.

'High level communication (HLC)': HLC is a special kind of digital communication. HLC is necessary for additional services which are not covered by command & control communication. The data link of the HLC may use a power line communication (PLC), but it is not limited.

'Low power excitation (LPE)': LPE means a technique of activating the primary device for the fine positioning ad pairing so that the EV can detect the primary device, and vice versa.

The charging station may comprise at least one GA and at least one GA controller managing the at least one GA. The GA may comprise at least one wireless communication device. The charging station may mean a place having at least one GA, which is installed in home, office, public place, road, parking area, etc.

Hereinafter, preferred example embodiments according to the present disclosure will be explained in detail by referring to accompanying figures.

FIG. 1 is a conceptual view of a wireless power transfer system including an active rectifier according to embodiments of the present disclosure.

As shown in FIG. 1, a wireless power transfer system according to embodiments of the present disclosure may comprise a ground assembly (GA) which is a power source, a vehicle assembly (VA) which is a power recipient, and an active rectifier 34 located in the VA.

The GA may comprise a power transmission part 10 for power conversion and control, and a first communication part 18 for charging control and communications. The first communication part 18 may be referred to as a GA controller. The GA may convert commercial power of a grid or a utility main, and transfer the converted power to a primary coil 16.

The VA may comprise a power receiving part 30 for power conversion and control, and a second communication part 38 for charging control and communications. The second communication part 38 may be referred to as a VA controller. The VA may convert power transferred from the primary coil 16 to a secondary coil 36 via magnetic coupling, and store the converted power in a battery 50. The battery 50 may be a traction battery for HEV or EV, which includes a high-voltage battery.

The active rectifier 34 may be a component which controls output of the wireless power transfer system in a vehicle side, or performs a corresponding operation. The active rectifier 34 may be implemented as having various forms according to types or structures of the rectifier.

For example, in a case that the active rectifier 34 is configured to have two diodes and two switches which are arranged in form of a bridge circuit located between the secondary coil 36 and the battery 50, the active rectifier 34 may control two switches according to a charging status of the battery 50 so that the battery 50 is to be charged or not to be charged. Thus, through the active rectifier, the VA may efficiently resolve a problem of protecting the high-voltage battery and controlling a charging current to the high-voltage battery, for reliable operations, according to the charging status of the high-voltage battery.

As another example, in a case that the active rectifier 34 is configured to have four switches which are arranged in form of a bridge circuit located between the secondary coil 36 and the battery 50, the active rectifier 34 may control two switches among the four switches to operate with the two diodes according to the charging status of the battery 50, and control two switches, the rest of the four switches, to charge or not to charge the battery 50. For this, semiconductor switching elements operating with the diodes may be included in the rectifier.

The above-described bridge circuit may include a full bridge rectifying circuit. The bridge circuit may include a cross-coupled rectifying circuit, etc. using metal oxide silicon field effect transistor (MOSFET) or complementary metal-oxide semiconductor (CMOS).

In the below description, for convenience of explanation, an active rectifier having two diodes and two switches will be explained.

Figure 2:
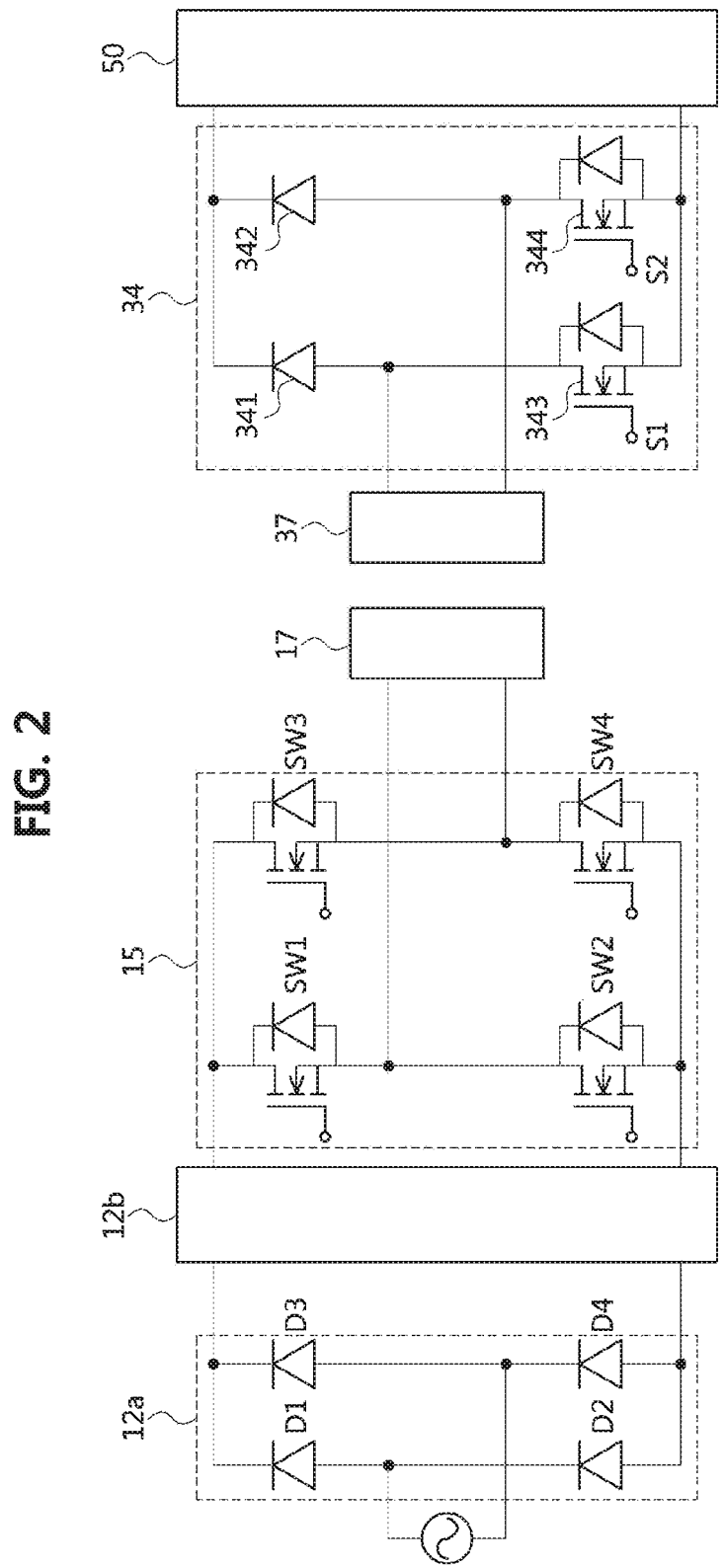
FIG. 2 is a detail view explaining an example of a wireless power transfer system including an active rectifier.

FIG. 2 is a detail view explaining an example of a wireless power transfer system including an active rectifier.

As shown in FIG. 2, a wireless power transfer system according to embodiments may comprise a GA and a VA, and the VA may include the active rectifier 34.

The GA may comprise a rectifier 12a, a power factor correction (PFC) converter 12b, and a direct current to direct current (DC-to-DC) converter 15. The GA may be connected to a commercial power source such as a grid.

The rectifier 12a may comprise an alternating current to direct current (AC-to-DC) converter in which four diodes D1, D2, D3, and D4 are arranged in a form of a bridge circuit. The rectifier 12a may be located between the power source such as the grid and the PFC converter 12b.

The PFC converter 12b is a converter correcting a power factor of the power output by the rectifier 12a. The power factor may be defined as a ratio of an effective power to an apparent power. The PFC converter 12b may be implemented in a form in which series circuits of switches and resistors are connected to a pair of power lines in parallel, and on-off operations of the switches are controlled. In this case, an active power factor controller for controlling the operations of the switches may be included in the PFC converter 12b.

The DC-to-DC converter 15 may convert the power output by the PFC converter 12b, and transfer the converted power to a primary pad 17. The DC-to-DC converter 15 may include four switching elements SW1, SW2, SW3, and SW4 which are arranged in a form of a bride circuit. Although it is explained that the DC-to-DC converter 15 comprising four switching elements supplies power to a primary coil of the primary pad 17, various embodiments are not restricted thereto. That is, an AC-to-DC converter (rectifier), a DC-to-AC converter, an AC-to-AC converter, or their combination may be further used for supplying power to the primary coil.

The primary pad 17 may comprise the primary coil. Also, according to implementations, the primary pad 17 may further comprise an impedance matching circuit, insulating material, or a housing for enclosing them. The primary coil may be included in the GA.

An active rectifier 34 is a component configured to charge or not charge the battery 50 according to a charging status of the battery 50 by using the power supplied from the GA. The active rectifier 34 may comprise at least one semiconductor element.

In embodiments of the present disclosure, the active rectifier 34 may comprise a first rectifying circuit 341, a second rectifying circuit 342, a first switching circuit 343, and a second switching circuit 344, which are arranged in a form of a bridge circuit between a secondary coil of the secondary pad 37 and the battery 50.

The first and second rectifying circuits 341 and 342 each may be implemented with a diode. However, without being restricted thereto, each of them may be implemented using a plurality of diodes, at least one switching element functioning as a diode, or a combination of at least one diode and at least one switching element.

The first switching circuit 343 or the second switching circuit 344 may be implemented with a power semiconductor element or a switching element corresponding to it. However, without being restricted thereto, each of them may be implemented using a plurality of switching elements.

Also, each of them may have a structure in which a current may flow through a switch channel of each when turned on, and a current may flow through a body diode of each when turned off. For this, each of them may have a structure into which at least one switching element and at least one diode are combined.

The above-described switching element may include a bipolar junction transistor (BJT), a field effect transistor (FET), a silicon controlled rectifier (SCR), a gate turn-off thyristor (GTO), an insulated gate bipolar transistor (IGBT), a triode AC controller (TRIAC), a static induction thyristor (SITH), a static induction transistor (SIT), a MOS controlled thyristor (MCT), a light activated silicon controlled rectifier (LASCR), a metal oxide semiconductor field effect transistor (MOSFET), a reverse conducting thyristor (RCT), a gate assisted turnoff thyristor (GATT), a MOS controlled thyristor (MCT), a silicon symmetrical switch (SSS), a silicon unilateral switch (SUS), a silicon bilateral switch (SBS), a light activated switch (LAS), a silicon controlled switch (SCS), or a light activated silicon controlled switch (LASCS).

Using the active rectifier 34, the charging power supplied to the battery 50 may be controlled according to the charging status of the battery 50 so that efficient and stable charging to the high-voltage battery can be performed. Here, the control of the battery charging power may include a procedure in which a previous voltage or current having a first strength is substituted with a voltage or current having a second strength below the first strength when the charging status of the battery 50 is equal to or above a first reference level. Of course, according to implementations, even for a second reference level below the first reference level, charging power of a voltage and/or current having a strength lower than that of the case of the first reference level can be supplied to the battery 50 for charging of the battery 50.

Meanwhile, for the control on the charging power to the battery 50 according to the charging status of the battery 50, the VA may use an active (intentional) misalignment control for the primary and secondary coils. In this case, the active misalignment control may be performed as combined with the above-described charging power control.

The battery 50 is a traction battery for EV or HEV. Also, the battery 50 may be a high-voltage battery having a rated voltage higher than that (e.g., less than 60V) of a low-voltage battery. Such the battery 50 may include at least one battery pack or module each of which comprises a plurality of cells, a cooling system for cooling the battery pack or module, and a controller which controls the battery pack or module and the cooling system, and supports in-vehicle communications.

Figure 3:
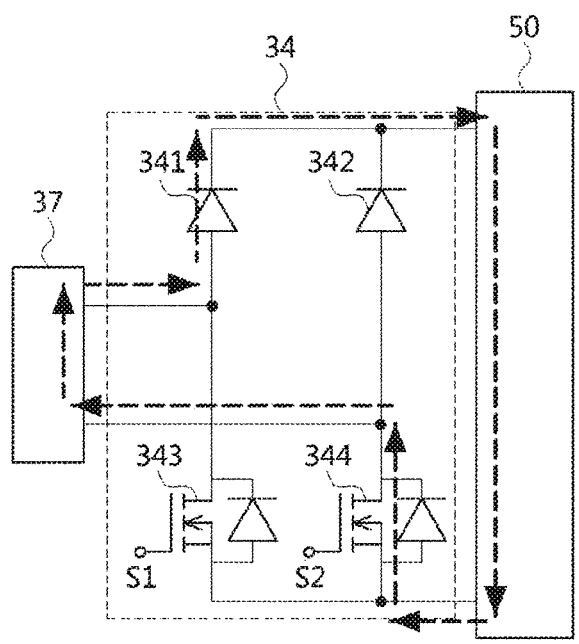
FIG. 3 is a circuit diagram to explain a first operation principle of an active rectifier.

FIG. 3 is a circuit diagram to explain a first operation principle of an active rectifier.

As shown in FIG. 3, when it is desired to increase output of the wireless power transfer system, an active rectifier 34 of a VA according to an embodiment may, in a 1A mode, selectively turn on or off the second switching circuit 344 while the first switching circuit 343 is turned off, and may, in a 1B mode, selectively turn on or off the first switching circuit 343 while the second switching circuit 344 is turned off, in accordance with a phase or orientation of the voltage and/or current induced in the secondary coil of the secondary pad 37.

In the 1A mode, a current may flow through a switch channel of the second switching circuit 344 when turned on, and a current may flow through a body diode of it when turned off. Similarly, in the 1B mode, a current may flow through a switch channel of the first switching circuit 343 when turned on, and a current may flow through a body diode of it when turned off.

Through the above-described control on the first and second switching circuits 343 and 344, the 1A mode and the 1B mode may be performed alternately whenever a phase of a voltage induced in the secondary coil changes so that an increased output of the wireless power transfer system can be transferred to the battery 50.

Figure 4:
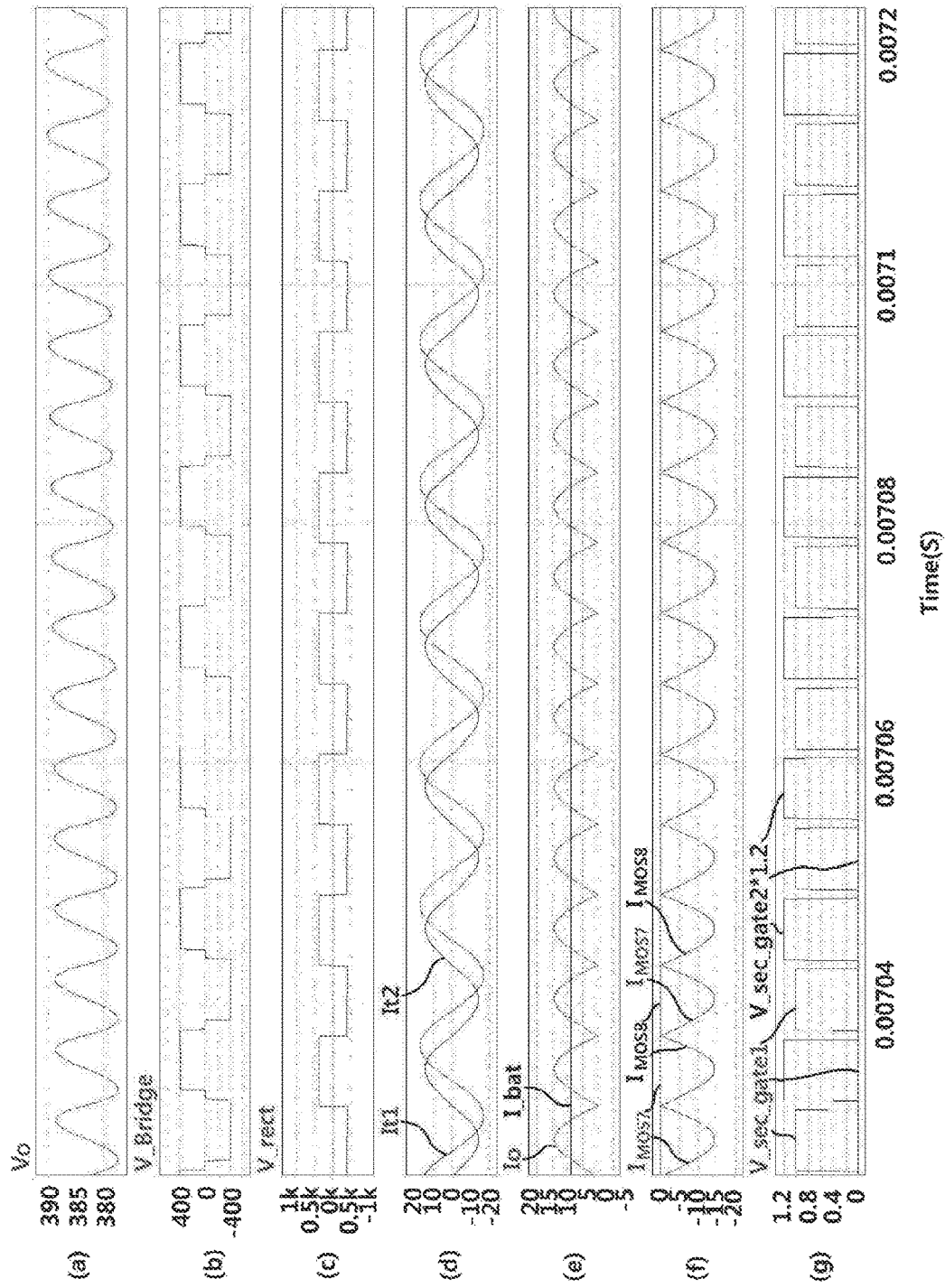
FIG. 4 is a timing diagram to explain a power flow of a wireless power transfer system using an active rectifier of FIG. 2.

FIG. 4 is a timing diagram to explain a power flow of a wireless power transfer system using an active rectifier of FIG. 2.

Referring to FIG. 2 and FIG. 4, as illustrated in (a) of FIG. 4, when an output voltage Vo of the rectifier 12a is about 385V, the DC-to-DC converter 15 may supply an AC voltage V_Bridge of about 400V to the primary coil, as illustrated in (b) of FIG. 4. In this case, a secondary current It2 having an AC current strength of about 12 A, corresponding to a primary current It1 having an AC current strength of about 17 A, may flow through the secondary coil coupling with the primary coil, as illustrated in (d) of FIG. 4. Thus, an AC voltage of about 400V may be transferred to the active rectifier 34 connected to the secondary coil, as illustrated in (d) of FIG. 4.

As illustrated in (e) of FIG. 4, the active rectifier 34 may supply charging power including an output current (Io or I_bat) having an average current strength of about 9 A to the battery 50 by actively rectifying the power inducted in the secondary coil. When the output current is larger than a root mean square (RMS) value obtained by multiplying about 0.7071 to the maximum value of the current induced in the secondary coil, it can be identified that the charging current has been certainly enhanced. However, even when the output current is similar as or slightly less than the current inducted in the secondary coil, the power rectified by the active rectifier 34 may be increased considerably as compared to the power rectified by the conventional rectifier.

As illustrated in (f) of FIG. 4, in order to generate the output current Io, the active rectifier 34 may convert a voltage or current, which is induced in the secondary coil and corresponds to a negative phase portion, into a voltage or current having a positive phase, by controlling the first switching circuit 343 (MOS7) and the second switching circuit 344 (MOS8).

Here, the first and second switching circuits 343 and 344 may be controlled based on the first and second control signals V_sec_gate1 and V_sec_gate2 of the controller included in the VA. The first control signal may have a signal level of about 1V, and the second control signal may have a signal level higher than that of the first control signal. For example, the signal level of the second control signal may be a value obtained by multiplying a predetermined value (e.g., 1.2) to the signal level of the first control signal. That is, the signal level of the second control signal may be about 1.2V.

As illustrated in (g) of FIG. 4, the first and second switching circuits 343 and 344 may operate to increase the output of the active rectifier 34 as compared to the input to them, by converting the negative phase portion of the AC voltage or current induced in the secondary coil into a portion having a positive phase according to the first and second control signals V_sec_gate1 and V_sec_gate2 which do not overlap with each other and have a time gap from each other.

Figure 5:
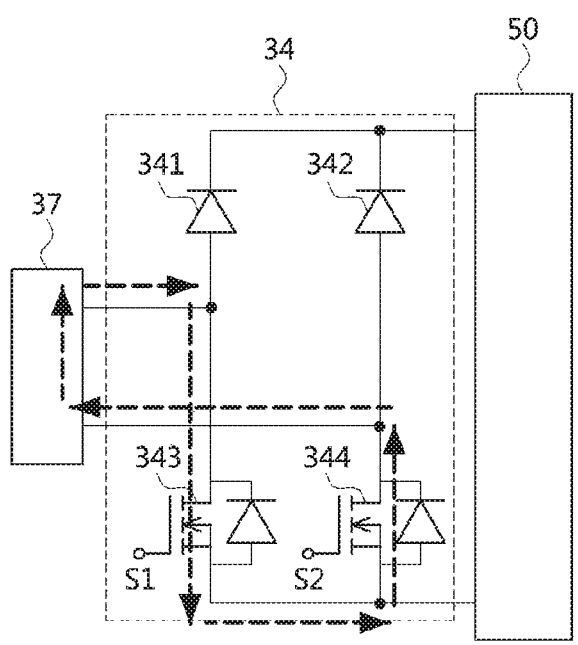
FIG. 5 is a circuit diagram to explain a second operation principle of an active rectifier.

FIG. 5 is a circuit diagram to explain a second operation principle of an active rectifier.

As shown in FIG. 5, when it is desired to decrease output of the wireless power transfer system, the active rectifier 34 of the VA according to an embodiment may, in a 2A mode, selectively turn on or off the second switching circuit 344 while the first switching circuit 343 is turned on, and may, in a 2B mode, selectively turn on or off the first switching circuit 343 while the second switching circuit 344 is turned off, in accordance with a phase or orientation of the voltage and/or current induced in the secondary coil of the secondary pad 37.

In the 2A mode, a current may flow through a switch channel of the second switching circuit 344 when turned on, and a current may flow through a body diode of it when turned off. Similarly, in the 2B mode, a current may flow through a switch channel of the first switching circuit 343 when turned on, and a current may flow through a body diode of it when turned off.

Through the above-described control on the first and second switching circuits 343 and 344, the 2A mode and the 2B mode may be performed alternately whenever a phase of a voltage induced in the secondary coil changes so that a decreased output of the wireless power transfer system can be transferred to the battery 50.

Figure 6:
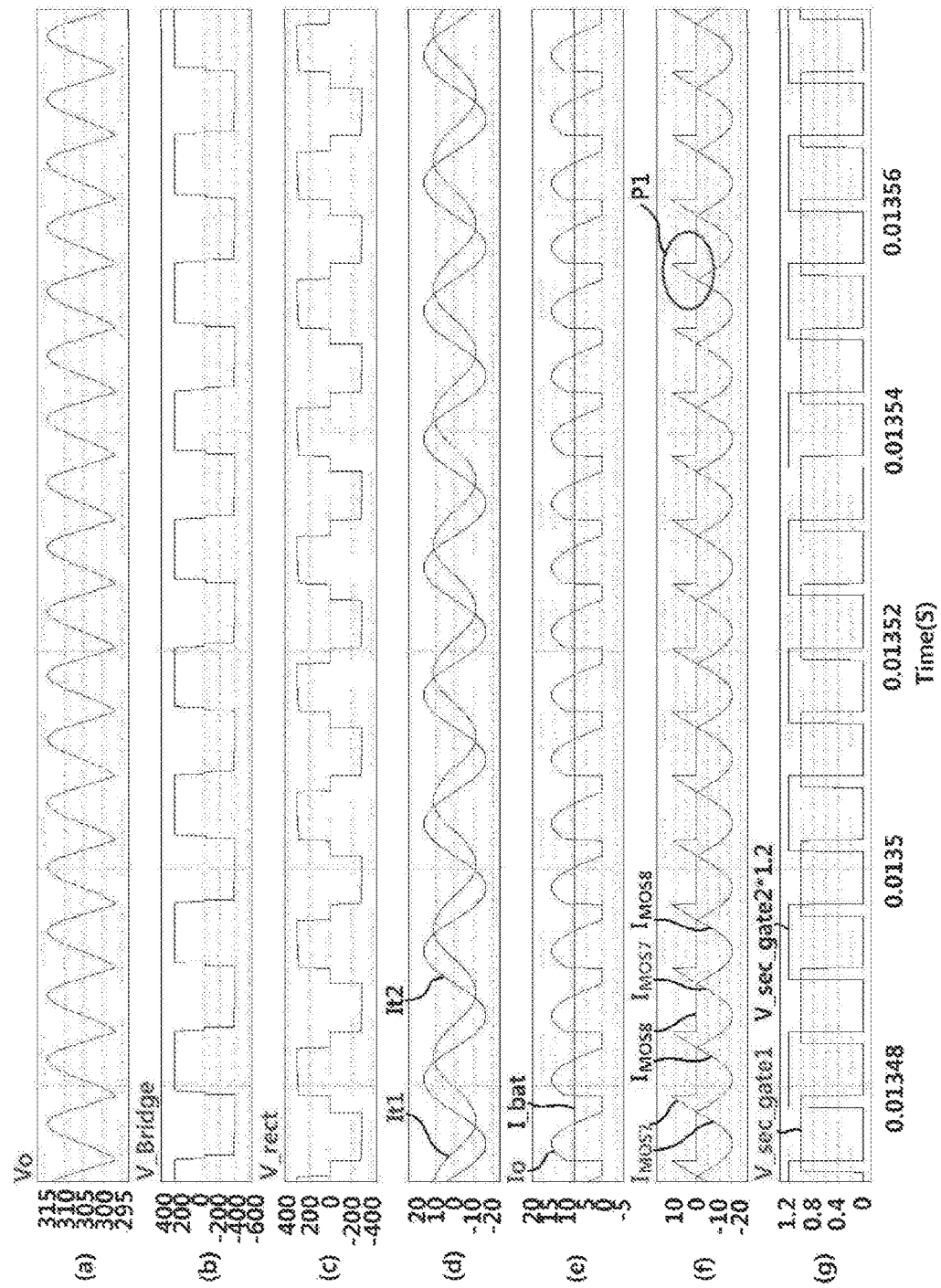
FIG. 6 is a view to explain an operation procedure of a vehicle assembly using an active rectifier.

FIG. 6 is a view to explain an operation procedure of a vehicle assembly using an active rectifier.

Referring to FIG. 2 and FIG. 6, as illustrated in (a) of FIG. 6, even when an output voltage Vo of the rectifier 12a falls to about 305V, the DC-to-DC converter 15 may supply an AC voltage V_Bridge of about 400V to the primary coil, as illustrated in (b) of FIG. 6. In this case, a secondary current It2 having an AC current strength of about 10 A, corresponding to a primary current It1 having an AC current strength of about 13 A, may flow through the secondary coil coupling with the primary coil. Thus, an AC voltage of about 350V may be transferred to the active rectifier 34 connected to the secondary coil, as illustrated in (c) of FIG. 6.

The active rectifier 34 may supply charging power including an output current (Io or I_bat) having an average current strength of about 9 A to the battery 50 by actively rectifying the power inducted in the secondary coil, as illustrated in (d) of FIG. 6.

In order to generate the above-described output current Io, as illustrated in (f) of FIG. 6, the active rectifier 34 may control the first switching circuit 343 (MOS7) and the second switching circuit 344 (MOS8) to perform zero-voltage switching operations so that a first current $I_{MOS7}$ flowing through the first switching circuit and a second current $I_{MOS8}$ flowing through the second switching circuit have a cancellation (offsetting) area (e.g., refer to a portion of P1) during a predetermined time period from each zero-phase point.

Here, the first and second switching circuits 343 and 344 may be controlled based on the first and second control signals V_sec_gate1 and V_sec_gate2 of the controller included in the VA. The first control signal may have a signal level of about 1V, and the second control signal may have a signal level higher than that of the first control signal. For example, the signal level of the second control signal may be a value obtained by multiplying a predetermined value (e.g., 1.2) to the signal level of the first control signal. That is, the signal level of the second control signal may be about 1.2V.

Also, as illustrated in (g) of FIG. 6, rising edges of the first control signal V_sec_gate1 may overlap with falling edges of the second control signal V_sec_gate2 by a predetermined width, and rising edges of the second control signal V_sec_gate2 may overlap with falling edges of the first control signal V_sec_gate1 by a predetermined width.

According to the present embodiment, even when the output of the wireless power transfer system increases or decreases, a charging power of a constant current can be supplied to the battery 50 through the active rectifier 34. Of course, through the control of the active rectifier 34, the charging power or the charging current of the charging power may also be decreased gradationally based on a charging power required according to the charging status of the battery 50 which is the high-voltage battery.

An operation method of a VA, which includes the secondary coil and the active rectifier, for managing charging of the in-vehicle battery by controlling the output of the active rectifier may be explained as follows.

First, battery charging status information may be received from the battery.

Then, it may be determined based on the battery charging status information whether a charging level of the battery is equal to or higher than a first reference level.

Then, when the charging level of the batter is less than the first reference level, the first and second switching circuits, among the first and second rectifying circuits and the first and second switching circuits which are arranged in form of a bridge circuit in the active rectifier, may be controlled so that the battery is to be charged or not to be charged according to the charging status of the battery.

In the control on the first and second switching circuits, in order to supply stable power which uniformly or gradationally decreases according to the charging status of the battery 50, one of the first and second switching circuits may be selectively turned on or off while the other of the first and second switching circuits is turned off, according to a phase of a voltage or current induced in the secondary coil when the output of the wireless power transfer system increases. Also, one of the first and second switching circuits may be selectively turned on or off while the other of the first and second switching circuits is turned on, according to a phase of a voltage or current induced in the secondary coil when the output of the wireless power transfer system decreases.

Figure 7:
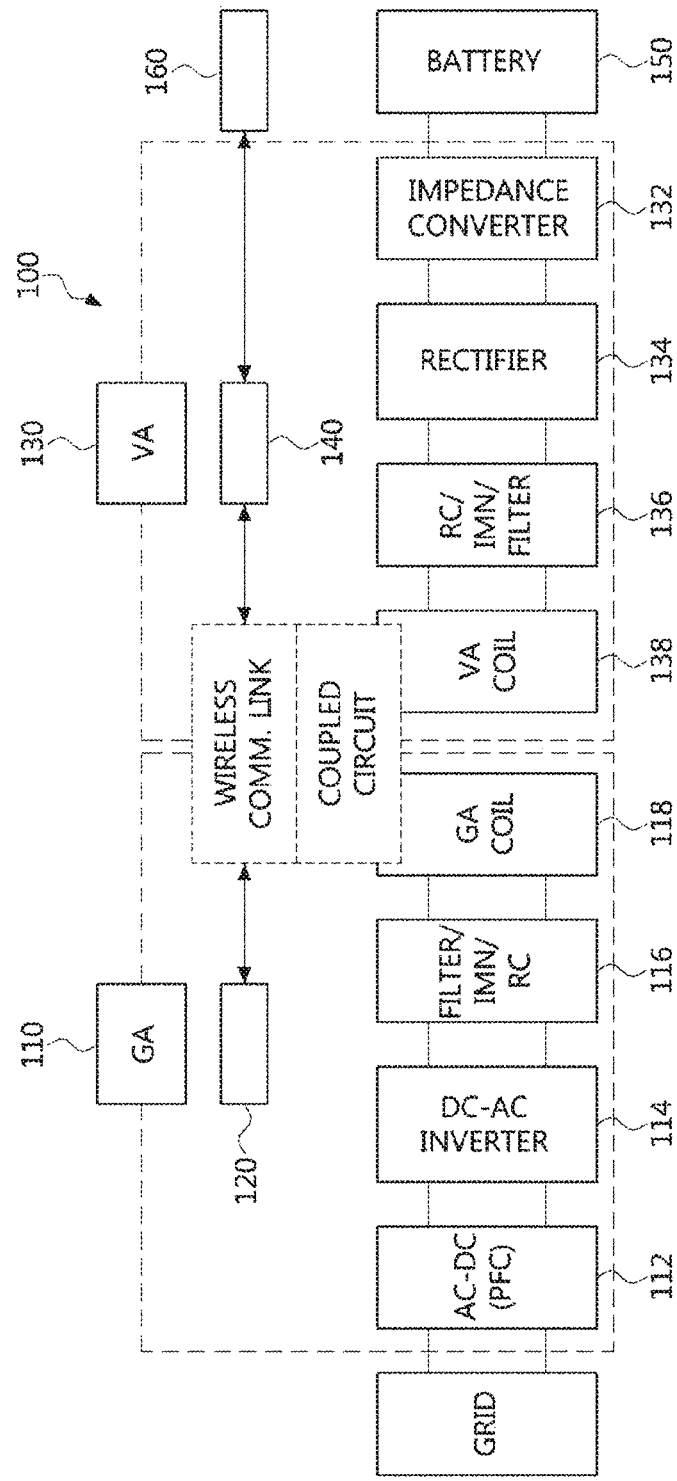
FIG. 7 is a block diagram to explain a wireless power transfer system which can use an active rectifier according to embodiments of the present disclosure.

FIG. 7 is a block diagram to explain a wireless power transfer system which can use an active rectifier according to embodiments of the present disclosure.

As shown in FIG. 7, a wireless power transfer system 100 according to embodiments of the present disclosure may comprise a GA 110 and a VA 130.

The GA 110 may comprise an alternating current to direct current (AC-to-DC) converter 112 having a power factor correction (PFC) function, a DC-to-AC converter 114, a filter/impedance matching network (IMN) 116, and a GA coil 118.

The VA 130 may comprise a VA coil 138 forming a coupled circuit with the GA coil 118, an IMN/filter 136, a rectifier 134, and an impedance converter 132. The impedance converter 132 may be connected to a battery. Here, the rectifier 134 may correspond to the active rectifier (34 of FIG. 2) according to embodiments of the present disclosure.

The VA 130 may further comprise a VA controller 140. The VA controller 140 may perform command and control communications and/or high-level communications with the GA controller 120 included in the GA 110 via a wireless communication link. Of course, the VA controller 140 may be connected with an electronic control unit 160 such as an engine control unit of the vehicle via an in-vehicle network such as Ethernet, CAN, or FlexRay.

The operation procedure of the wireless power transfer system 100 may be explained as follows.

First, a current used for charging the battery 150 is determined in the VA 130.

Then, a power request is transferred from the VA 130 to the GA 110 via the wireless communication link.

Then, the GA 110 may recognize the power request from the VA 130, convert power supplied from the grid to high frequency AC power, and transfer the converted AC power to the GA coil 118.

Then, the high frequency AC power may be transferred from the GA coil 118 to the VA coil 138 via coupling, rectified by the rectifier 134 in the VA 130, and finally used to charge the battery.

The above-described procedure continues until the battery is fully charged and the VA 130 transmits a signal indicating completion of the charging to the GA 110.

Figure 8:
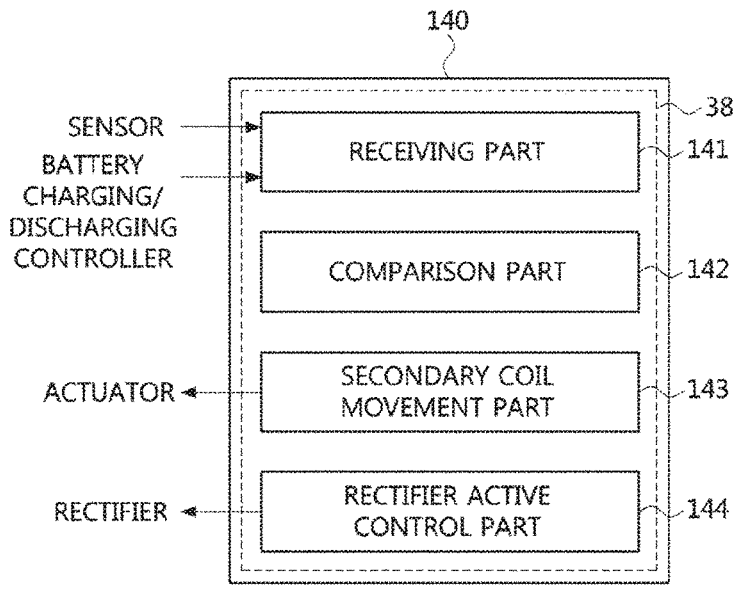
FIG. 8 is a block diagram to explain a vehicle assembly controller which can be used in a wireless power transfer system of FIG. 7.

FIG. 8 is a block diagram to explain a vehicle assembly controller which can be used in a wireless power transfer system of FIG. 7.

As shown in FIG. 8, the VA controller 140 according to the present embodiment may comprise a receiving part 141, a comparison part 142, a secondary coil movement part 143, and a rectifier active control part 144.

The receiving part 141 may be connected to a sensor for measuring a voltage or current inducted in the secondary coil. That is, the receiving part 141 may receive information on power induced in an output side of the wireless power transfer system from the sensor.

Also, the receiving part 141 may receive battery related information from the battery. That is, the receiving part 141 may receive the battery related information such as battery charging status information from a battery management system (BMS) or a battery charging controller managing the high-voltage battery of the vehicle.

The comparison part 142 may compare the strength of the voltage or current induced in the secondary coil with a predetermined reference value or a preconfigured first reference level. Also, the comparison part 142 may compare a current charging level of the battery obtained from the battery charging status information with a predetermined reference value or a preconfigured first reference level.

The reference value or the first reference level may corresponding to an upper limit or lower limit of a normal operation level range predetermined for a voltage, current, or power induced in the secondary coil. Also, according to implementations, the reference value or the first reference level may indicate a charging level at which a state where a first current is supplied to the battery should be transitioned to a state where a second current smaller than the first current is supplied to the battery according to charging characteristics of the high-voltage battery.

The secondary coil movement part 143 may move the secondary coil based on the comparison result of the comparison part 142 so that the power supplied to the battery or the output of the rectifier in the VA corresponding to the power can be maintained constantly. If the secondary coil movement part 143 moves the secondary coil, the power induced in the secondary coil of the VA or the output of the rectifier may change.

For example, the power transferred wirelessly from the primary coil to the secondary coil may be increased due to a problem of the grid or the GA. In this case, in order to reliably charge the battery with constant power, the VA may reduce the power induced in the secondary coil to a desired level by moving the secondary coil and thus intentionally misaligning the primary coil and secondary coil within a predetermined range.

Also, for example, the power transferred wirelessly from the primary coil to the secondary coil may be decreased due to a problem of the grid or the GA. In this case, in order to reliably charge the battery with constant power, the VA may increase the power induced in the secondary coil to a desired level by moving the secondary coil and thus intentionally decreasing a degree of misalignment between the primary and secondary coils within a predetermined range.

Since the wireless power transfer system usually operates based on an alignment position at which an optimal or maximum efficiency can be achieved, it may be not easily realized to decrease the degree of misalignment. However, actual types or sizes of the primary and secondary coils are different, and thus a marginal value for the optimal alignment position may exist, and the marginal value may vary with easiness according to various wireless power transfer environments such as weather, temperature, foreign objects, etc. Thus, the control of the degree of misalignment can be performed by moving one of the primary and secondary coils to a better or worse alignment position during monitoring of the wireless power transfer.

Through the above-described secondary coil movement part 143, the degree of misalignment for the secondary coil may be changed while performing wireless power transfer so that the charging power to the battery may be maintained constantly or changed to a desired level according to a change of the output of the wireless power transfer system or a charging status of the battery. The function of the secondary coil movement part 143 may be performed complementarily to the function of controlling the charging power to the battery by the above-described active rectifier.

The rectifier active control part 144 may control the first and second switching circuits by transferring the first and second control signals to the rectifier including the first and second switching circuits, thereby maintaining or changing the output of the rectifier in the VA. Such the function of the rectifier active control part 144 may be additionally performed after the secondary coil movement part 143 performs its function. However, without being restricted thereto, the two functions may be performed independently complementarily, or priorities may be given to respective functions so that one of the two functions can be performed preferentially for specific sensing information or event information.

Meanwhile, the above-described receiving part 141, comparison part 142, secondary coil movement part 143, and rectifier active control part 144 may be implemented as software modules stored in a storage part such as memory. In this case, the VA controller 140 may execute the software modules to effectively cope with environmental changes or directly manage wireless power transfer environments.

Also, according to implementations, the components performing functions corresponding to those of the software modules may be located in the VA controller 140. In this case, the above-described receiving part 141, comparison part 142, secondary coil movement part 143, and rectifier active control part 144 may be implemented as at least part of control elements in a controller 38. The controller 38 may be included in the VA controller 140. However, without being restricted thereto, the controller 38 may be located to cooperate with the VA controller 140.

Figure 9:
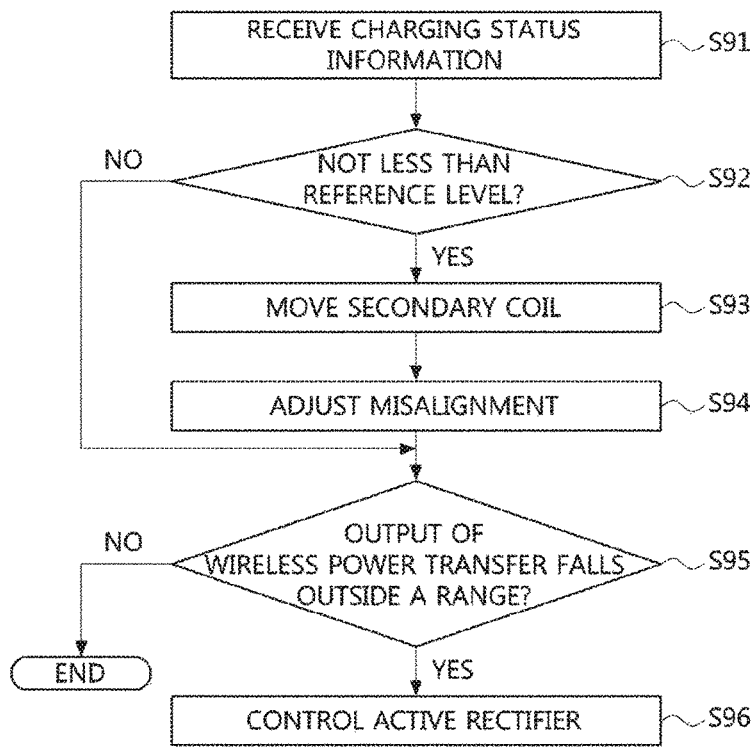
FIG. 9 is a flow chart to explain a flow chart of an operation method of a vehicle assembly according to embodiments of the present disclosure.

FIG. 9 is a flow chart to explain a flow chart of an operation method of a vehicle assembly according to embodiments of the present disclosure.

As shown in FIG. 9, in the VA operation method according to embodiments of the present disclosure, the VA may increase or decrease the power of the rectifier by moving the secondary coil using an actuator, thereby controlling the charging power to the battery.

For this, the VA controller may receive battery charging status information from the battery (S91). The battery charging status information may be generated and received from a battery management system (BMS) or a battery charging controller which manages charging/discharging of the battery or statuses of the battery such as temperature, etc. Also, the battery charging status information may include information on stage of charge (SOC) of the battery.

Then, it may be determined based on the battery charging status information whether a battery charging level is above a first reference level (S92). The first reference level may include a voltage level or a current level. The VA controller may maintain, decrease, or increase the charging current to the battery based on the determination result.

Then, when the battery charging level is above the first reference level, the secondary coil may be moved by using an actuator connected to the secondary pad (S93). This is for intentionally misaligning the primary and secondary coils within a predetermined range. Through the above-described intentional misalignment, the output of the wireless power transfer system may be reduced, and thus the output of the rectifier may also be decreased.

Also, in the misalignment of the primary and secondary coils, it may be determined whether a desired reduction in the output of the rectifier is achieved or not, and the misalignment may be further adjusted based on the determination result (S94).

For example, the misalignment adjustment procedure may comprise, after the misalignment, a step of detecting a current flowing through the secondary coil, a step of comparing the detected current with a reference current, and a step of further moving the secondary coil so that the detected current falls within a predetermined range from the reference current.

On the other hand, in order to perform the control on the output of the rectifier and the charging power to the battery through the above-described secondary coil movement, it may be further detected whether the output of the wireless power transfer falls outside a predetermined range (S95), and the output of the active rectifier may be maintained, decreased, or increased according to the detection result through the above-described control on the active rectifier (S96). Since such the control on the active rectifier was explained in detail referring to FIGS. 2 to 8, redundant explanation on it is omitted.

Meanwhile, when the battery charging level is below the first reference level (S97), the VA controller may skip the step S93 or the step S94, and then directly perform the step S95 for monitoring whether a big change in the output of the wireless power transfer system exists or not.

According to the present embodiments, the VA of the wireless power transfer system may control the charging power supplied to the battery according to the charging status of the battery through mechanical operations, and maintain the output of the active rectifier so that the charging power to the battery is maintained even when various environmental changes exist.

Figure 10:
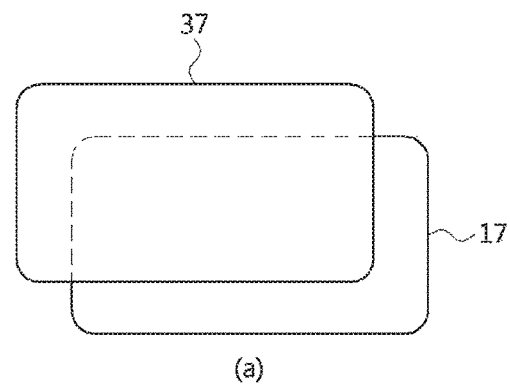
FIG. 10 is a plane view to explain a principle of a vehicle assembly operation method of FIG. 10.
Figure 11:
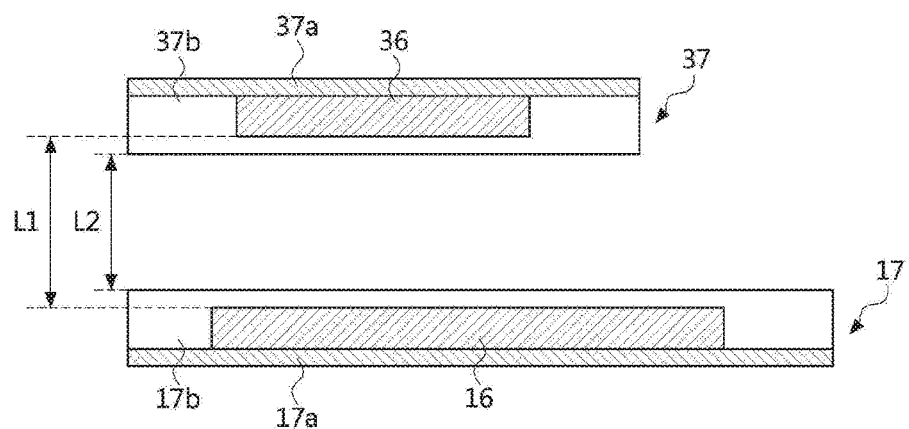
FIG. 11 is a cross-sectional view to explain a variation of a vehicle assembly operation method of FIG. 10.

FIG. 10 is a plane view to explain a principle of a vehicle assembly operation method of FIG. 10, and FIG. 11 is a cross-sectional view to explain a variation of a vehicle assembly operation method of FIG. 10.

In the VA operation method according to embodiments, as illustrated in (a) of FIG. 10, the VA controller may move the secondary pad 37 comprising the secondary coil to a position which is located at a predetermined distance in x-axis and/or y-axis from a center (e.g., a center of a magnetic field) of the primary pad 17 comprising the primary coil.

Also, as illustrated in (b) of FIG. 10, the VA controller may rotate the secondary pad 37 by a predetermined angle, having the center (e.g., the center of the magnetic field) of the primary pad 17 as a center of the rotation.

Also, as illustrated in FIG. 11, the VA controller may change a relative distance L1 of the secondary coil 36 included in the secondary pad 37 from the primary coil 16 included in the primary pad 17. The relative distance L1 may be substituted with a gap L2 between the primary pad 17 and secondary pad 37. In the primary pad 17, the primary coil 16 may be supported by a supporting element 17a such as core or ferrite, and enclosed by a housing 17b. Similarly, in the secondary pad 37, the secondary coil 36 may be supported by a supporting element 37a, and enclosed by a housing 37b. The secondary pad 37 may have durability suitable to use for vehicle charging.

In order to achieve the desired reduction in the output of the wireless power transfer through the above-described movement of the secondary coil, the VA controller may obtain information on the type or shape of the primary coil from the GA controller before starting the wireless power transfer.

Meanwhile, although it was explained that the VA controller moves the secondary coil by using an actuator which is basically equipped in the vehicle, embodiments of the present disclosure are not restricted thereto. For example, the VA controller may provide the GA controller with displacement information for movement of the primary coil, and the GA controller may move the primary coil based on the displacement information. Also, a combination of the above two methods (i.e., movement of the primary coil or the secondary coil) may also be used.

Also, although the reduction in the output of the wireless power transfer was mainly explained, embodiments are not restricted thereto. That is, in order to increase the output of the wireless power transfer, a degree of alignment may be enhanced by moving the secondary coil (or, the primary coil). Also, through the movement of the secondary (or, primary) coil, the charging power to the battery can be stably maintained regardless of changes in the output of the wireless power transfer.

While example embodiments of the present disclosure and their advantages have been described in detail above, it should be understood that various changes, substitutions and alterations may be made herein without departing from the scope of the disclosure.

What is claimed is:

1. An active rectifier for a wireless power transfer system, the active rectifier comprising:
   a first rectifying circuit;
   a second rectifying circuit;
   a first switching circuit;
   a second switching circuit; and
   a controller, wherein
   the first rectifying circuit, the second rectifying circuit, the first switching circuit, and the second switching circuit are arranged in a form of a bridge circuit between a secondary coil of a vehicle and a battery of the vehicle,
   the active rectifier controls the first and second switching circuits according to a charging status of the battery or an output status of the wireless power transfer system in order to change or maintain a charging power to the battery,
   a first connection node between a first terminal of the first rectifying circuit and a first terminal of the first switching circuit and a second connection node between a first terminal of the second rectifying circuit and a first terminal of the second switching circuit are connected to both ends of the secondary coil,
   a first common terminal between a second terminal of the first rectifying circuit and a second terminal of the second rectifying circuit and a second common terminal between a second terminal of the first switching circuit and a second terminal of the second switching circuit are connected to both ends of the battery, when an increased output of the wireless power transfer system is desired, the controller selectively turns on or off one of the first and second switching circuits while the other of the first and second switching circuits is turned off according to a phase of a voltage or current induced in the secondary coil, and when a decreased output of the wireless power transfer system is desired, the controller selectively turns on or off one of the first and second switching circuits while the other of the first and second switching circuits is turned on according to the phase of the voltage or current induced in the secondary coil.

2. The active rectifier according to claim 1, wherein the controller controls the first and second switching circuits and outputs control signals for one or more of the first switching circuit and the second switching circuit based on battery charging status information received from the battery.

3. The active rectifier according to claim 2, wherein the controller controls on-off operations of one or more of the first switching circuit and the second switching circuit according to a phase of a voltage or current induced in the secondary coil.

4. The active rectifier according to claim 1, wherein the first switching circuit or the second switching circuit includes a semiconductor switching element including a switch channel through which a current flows when turned on, and a current flows through a body diode when turned off.

5. A vehicle assembly used for a wireless power transfer system, the vehicle assembly comprising:
   a secondary coil which is equipped in a vehicle and couples inductively with an external primary coil;
   a battery equipped in the vehicle for driving the vehicle;
   a rectifier including a first rectifying circuit, a second rectifying circuit, a first switching circuit, and a second switching circuit which are arranged in a form of a bridge circuit between the secondary coil and the battery; and
   a vehicle assembly controller, wherein
   in the rectifier, a first connection node between a first terminal of the first rectifying circuit and a first terminal of the first switching circuit and a second connection node between a first terminal of the second rectifying circuit and a first terminal of the second switching circuit are connected to both ends of the secondary coil, and a first common terminal between a second terminal of the first rectifying circuit and a second terminal of the second rectifying circuit and a second common terminal between a second terminal of the first switching circuit and a second terminal of the second switching circuit are connected to both ends of the battery,
   when an increased output of the wireless power transfer system is desired, the controller selectively turns on or off one of the first and second switching circuits while the other of the first and second switching circuits is turned off according to a phase of a voltage or current induced in the secondary coil, and
   when a decreased output of the wireless power transfer system is desired, the controller selectively turns on or off one of the first and second switching circuits while the other of the first and second switching circuits is turned on according to the phase of the voltage or current induced in the secondary coil.

6. The vehicle assembly according to claim 5, wherein the vehicle assembly controller receives battery charging status information and controls the rectifier based on the battery charging status information.

7. The vehicle assembly according to claim 6, wherein the vehicle assembly controller controls on-off operations of one or more of the first switching circuit and the second switching circuit according to a phase of a voltage or current induced in the secondary coil.

8. The vehicle assembly according to claim 5, wherein the first switching circuit or the second switching circuit includes a semiconductor switching element including a switch channel through which a current flows when turned on, and a current flows through a body diode when turned off.

9. The vehicle assembly according to claim 5, further comprising at least one of a resonance circuit located between the secondary coil and the rectifier, an impedance matching circuit between the secondary coil and the rectifier, a filter located between the secondary coil and the rectifier, and an impedance converter located between the rectifier and the battery.

10. An operation method of a vehicle assembly including a secondary coil and a rectifier which controls output of the rectifier to manage charging of a battery equipped in a vehicle, the method comprising:
   receiving battery charging status information from the battery;
   determining whether a battery charging level according to the battery charging status information is greater than a reference level; and
   when the battery charging level is greater than the reference level, controlling a first switching circuit and a second switching circuit of the rectifier according to a charging status of the battery, wherein
   a first rectifying circuit, a second rectifying circuit, the first switching circuit, and the second switching circuit are arranged in a form of a bridge circuit in the rectifier, and
   the controlling of the first switching circuit and a second switching circuit comprises:
      when the battery is charged, selectively turning on or off one of the first and second switching circuits while turning off the other of the first and second switching circuits according to a phase of a voltage or current induced in the secondary coil; and
      when the battery is not charged, selectively turning on or off one of the first and second switching circuits while turning on the other of the first and second switching circuits according to the phase of the voltage or current induced in the secondary coil.

11. An operation method of a vehicle assembly including a secondary coil and a rectifier which controls output of the rectifier to manage charging of a battery equipped in a vehicle, the method comprising:
   receiving battery charging status information from the battery;
   determining whether a battery charging level according to the battery charging status information is greater than a reference level;
   when the battery charging level is greater than the reference level, moving the secondary coil to misalign the secondary coil with a primary coil which inductively couples with the secondary coil within a predetermined range; and
   after the moving of the secondary coil, controlling a first switching circuit and a second switching circuit of the rectifier according to a charging status of the battery or an output status of a wireless power transfer system, in order to increase or decrease charging power to the battery, wherein a first rectifying circuit, a second rectifying circuit, the first switching circuit, and the second switching circuit are arranged in a form of a bridge circuit in the rectifier, and the controlling of the first switching circuit and a second switching circuit comprises:

when the battery is charged, selectively turning on or off one of the first and second switching circuits while turning off the other of the first and second switching circuits according to a phase of a voltage or current induced in the secondary coil; and when the battery is not charged, selectively turning on or off one of the first and second switching circuits while turning on the other of the first and second switching circuits according to the phase of the voltage or current induced in the secondary coil.

12. The operation method according to claim 11, further comprising, after the moving of the secondary coil:

detecting a current flowing through the secondary coil;

comparing the current with a reference current; and adjusting the misalignment between the primary and secondary coils by further moving the secondary coil so that the current falls within an error range of the reference current.

\* \* \* \* \*